United States Patent [19]

Sekidou et al.

[11] Patent Number: 5,034,268
[45] Date of Patent: Jul. 23, 1991

[54] OFFSET BLANKET

[75] Inventors: Fumio Sekidou, Akashi; Yasuhiko Kondou, Nishinomiya; Toshikazu Ogita, Miki; Hisao Kagano, Takarazuka, all of Japan

[73] Assignee: Sumitomo Rubber Industries, Ltd., Hyogo, Japan

[21] Appl. No.: 564,668

[22] Filed: Aug. 9, 1990

Related U.S. Application Data

[63] Continuation of Ser. No. 238,069, Aug. 30, 1988, abandoned.

[30] Foreign Application Priority Data

Oct. 7, 1987 [JP] Japan ................. 62-153777

[51] Int. Cl.$^5$ ............ B32B 3/26; B29C 3/00
[52] U.S. Cl. ................. 428/286; 428/314.4; 428/319.3; 428/909
[58] Field of Search ........... 428/286, 314.4, 314.8, 428/319.3, 908, 909

[56] References Cited

U.S. PATENT DOCUMENTS

| 3,676,282 | 7/1972 | Volmer ................. 428/909 |
| 3,819,471 | 6/1974 | Sohnemann ................. 428/909 |
| 4,093,764 | 6/1978 | Duckett et al. ................. 428/909 |
| 4,174,244 | 11/1979 | Thomas et al. ................. 428/319.3 |
| 4,548,858 | 10/1985 | Meadows ................. 428/909 |
| 4,770,928 | 9/1988 | Gaworowski et al. ................. 428/909 |

FOREIGN PATENT DOCUMENTS

| 49-3045 | 1/1974 | Japan . |
| 52-7371 | 3/1977 | Japan . |
| 56-93591 | 7/1981 | Japan . |
| 56-154089 | 11/1981 | Japan . |
| 58-42047 | 3/1983 | Japan . |

Primary Examiner—William J. Van Balen
Attorney, Agent, or Firm—Armstrong, Nikaido, Marmelstein, Kubovcik & Murray

[57] ABSTRACT

An offset blanket comprising, in lamination, a surface printing layer, a support layer for supporting the surface printing layer and a porous primer layer for bonding the surface printing layer and the support layer. The primer layer is porous to improve the peeling properties and the shock absorbing properties thereof.

3 Claims, 2 Drawing Sheets

OFFSET BLANKET

This application is a continuation of application Ser. No. 238,069 filed Aug. 30, 1988, abandoned.

BACKGROUND OF THE INVENTION

The present invention relates to an offset blanket which is one of elements constituting an offset printing machine.

Conventionally, offset lithography is widely used as a printing method capable of producing printed matter of a high quality.

The offset lithography employs a blanket which includes a blanket cylinder and an offset blanket wound thereon.

FIG. 4 is a schematic section view of a conventional offset blanket. In FIG. 4, an offset blanket 20 includes a surface printing layer 21 made of rubber, plastic such as urethane, or the like, and a support layer 22 for supporting the surface printing layer 21. The other surface of the support layer 22 than the surface thereof for supporting the surface printing layer 21 is mounted as wound on the periphery of the blanket cylinder.

In the offset blanket 20 having the arrangement above-mentioned, a plate cylinder (not shown) transfers printing inks in a predetermined pattern to the offset blanket 20, and the printing inks thus transferred are then transferred onto printing paper supplied between the offset blanket 20 and the impression cylinder, thus achieving offset lithography.

The offset blanket 20 may be used in a special manner when carrying out UV varnishing printing, metal printing or the like with the use of ultraviolet curing inks (UV inks), oil inks or the like. That is, the offset blanket 20 is wound on the blanket cylinder, and a portion of the surface printing layer 21 is then cut and peeled off before printing is carried out. Thus, the surface printing layer 21 has a portion on which the printing inks are not to be applied. After the printing has been carried out, a stencil number is marked on the portion on which the inks have not been applied.

When cutting and peeling off a portion of the surface printing layer 21 of the offset blanket 20, such peeling can be easily made if the surface printing layer 21 has tensile strength greater than the peel strength of peeling the surface printing layer 21 from the support layer 22. When the tensile strength of the surface printing layer 21 is increased, the hardness of the surface printing layer 21 is generally increased.

However, if the hardness is increased, this not only makes it difficult to transfer the printing inks onto the surface printing layer 21, but also increases the shock exerted on the plate cylinder or the like by the surface printing layer 21. This causes the durability of the offset lithographic plate to be lowered.

To improve the peeling properties of the surface printing layer 21, the peel strength of peeling the surface printing layer 21 from the support layer 22 may be decreased. However, if the peel strength is excessively decreased, this creates the problem that the surface printing layer 21 is peeled from the support layer 22 in the course of offset lithography, provoking defective printing or the like.

SUMMARY OF THE INVENTION

In view of the foregoing, the present invention is proposed with the aim of providing an offset blanket in which the surface printing layer is easily peeled off and yet the surface printing layer is not peeled off in the course of printing, without excessively increasing the tensile strength of the surface printing layer and without excessively decreasing the peel strength.

To achieve the object above-mentioned, the offset blanket in accordance with the present invention comprises, in lamination, a surface printing layer, a support layer for supporting the surface printing layer and a porous primer layer disposed between the surface printing layer and the support layer.

The offset blanket having the arrangement above-mentioned may increase the peeling properties of the surface printing layer at the time when a portion of the surface printing layer is cut and peeled off. This is because the primer layer between the surface printing layer and the support layer is porous to decrease the cohesive stress of the primer layer. On the other hand, the peel strength of peeling the surface printing layer from the primer layer is not excessively decreased. This prevents the surface printing layer from being peeled off from the suport layer in the course of the offset printing.

Further, the offset blanket of the present invention has the primer layer of a porous structure which also serves as a shock absorber. This prevents the occurrence of shock-streaks which may provoke defective printing.

DETAILED DESCRIPTION OF THE EMBODIMENTS

Figure 1:
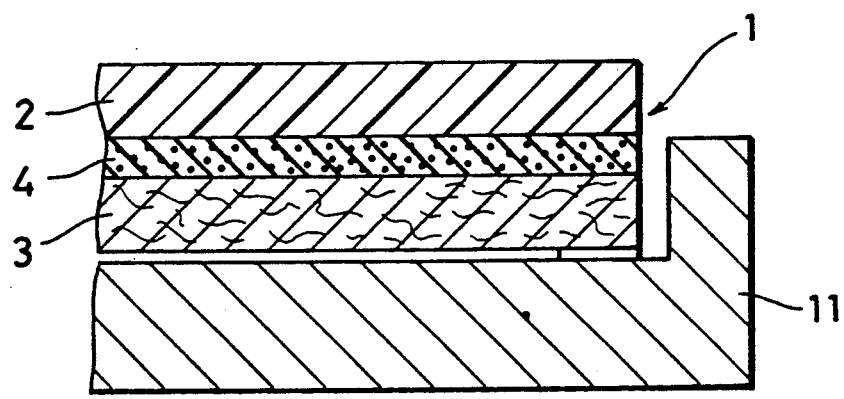
FIG. 1 is a schematic section view of an embodiment of offset blanket and blanket cylinder in accordance with the present invention.

In FIG. 1, an offset blanket 1 comprises, in lamination, a surface printing layer 2 serving as a printing ink receiving surface layer, a support layer 3 disposed at the reverse side of the surface printing layer 2 for supporting the same, and a porous primer layer 4 disposed between the surface printing layer 2 and the support layer 3 for bonding both layers 2 and 3.

The surface printing layer 2 is made of (a) plastic elastomer such as polyurethane, (b) rubber elastomer such as nitrile rubber, or (c) the like. The surface printing layer 2 is adapted to receive printing inks carried on the offset lithographic plate, and the inks thus received are transferred to a material to be printed such as printing paper supplied to the impression cylinder, thus achieving offset lithography.

The support layer 3 includes one or more layers made of a reinforcing fabric or the like (not shown), and is wound around a blanket cylinder 11.

The primer layer 4 is porous, thereby to facilitate the peeling of the surface printing layer 2, as well as to enable to achieve good printing. To maintain the adhesive strength of the primer layer 4 with respect to the surface printing layer 2 and the support layer 3 and to decrease the cohesive stress of the primer layer 4, the primer layer 4 is made in the form of a foam body layer including closed cells and/or open cells.

The primer layer 4 including closed cells may be made by a variety of methods.

According to a first method, the primer layer 4 may be made by vulcanizing a mixture of a material such as acrylonitrile-butadiene rubber (NBR) with thermoplastic hollow bodies such as saran microspheres, or inorganic hollow bodies such as glass beads, silas baloon or the like.

According to a second method, the primer layer 4 may be made by heating a mixture of the primer layer material with an organic foaming agent or an inorganic foaming agent so as to be foamed.

In the first method, two or more types of thermoplastic hollow bodies and/or inorganic hollow bodies may be mixed with the primer layer material, and in the second method, two or more types of organic foaming agents and/or inorganic foaming agents may be mixed with the primer layer material.

The organic foaming agent includes:

(1) a foaming agent having a low boiling point such as
   (a) hydrocarbon including methane, ethane, propane, butane, pentane, hexane and the like
   (b) flon including trichlorofluoromethane (FLEON 11 manufactured by Du Pont Company), dichlorodifluoromethane (FLEON 12 manufactured by Du Pont Company) and the like,
   (c) ether including methyl ether, ethyl ether, and the like
   (d) ketone including acetone and the like;
(2) a foaming agent of the azo type such as azobisisobutyronitrile and the like;
(3) a foaming agent of the hydrazine type such as diphenylsulfone -3, 3'-disulfohydrazine and the like;
(4) a foaming agent of the semicarbazide type such as p-toluylene sulfonyl semicarbazide and the like;
(5) a foaming agent of the triazole type such as 5-morpholil-1, 2, 3, 4 - thia-triazole and the like; and
(6) a foaming agent of the N-nitroso type such as N, N'-dinitroso pentamethylenetetramine and the like.

The inorganic agent includes ammonium carbonate, ammonium bicarbonate, sodium bicarbonate, and sodium borohydride.

When heated, the foaming agent is expanded. With such expansion, the foaming agent generates closed cells in the primer layer material such as NBR. This causes the primer layer to become porous with the solidification thereof.

Preferably, the primer layer 4 including closed cells is made by heating and vulcanizing a mixture of the primer layer material with the hollow bodies or the foaming agent above-mentioned.

Preferably, the primer layer 4 including open cells is made by mixing a soluble substance such as salts including sodium chloride, magnesium sulfate with the primer material such as NBR, and by carrying out a leaching treatment of eluting the soluble substance with the use of a solvent, for example water, for eluting the soluble substance after the vulcanization.

The primer layer 4 may include: a reinforcing filler such as silica, carbon black; a plasticizer; a vulcanizing accelerator; a vulcanizing accelerating aid such as zinc white, stearic acid and the like; a softening agent; an aging inhibitor; a bulking agent; a colorant and the like.

The diameters of the cells in the primer layer 4 made in the manner above-mentioned, may be suitably set according to the desired peeling properties or the like. Preferably, the cells have diameters in a range from 1 to 100 μm (the average of the major and minor axes of the cells in the cross-sectional view of the primer layer 4), and more preferably in a range from 30 to 100 μm. With cell diameters less than 1 μm, the peeling properties of the surface printing layer 2 are not sufficient. With cell diameters exceeding 100 μm, the primer layer 4 having excessively low cohesive stress is obtained.

The cohesive stress of the primer layer 4 may be suitably set in such a range as not to lose the easy peeling of the surface printing layer 2 and the good printing characteristics. Preferably, the cohesive stress is in a range such that the peel strength is in a range from 0.3 to 0.7 kg/cm, and more preferably in a range from 0.4 to 0.6 kg/cm. To obtain the peel strength in a range from 0.3 to 0.7 kg/cm, the voids of the primer layer 4 may be set in a range from 40 to 80%.

When making the primer layer 4 having the peel strength in the range above-mentioned with the use of thermoplastic hollow bodies and the like, the primer material may be mixed with about 5 to 10% by weight of the thermoplastic hollow bodies and the like, and the mixture may be then heated to be foamed.

The primer layer 4 may have a suitable thickness, generally in a range from 20 to 100 μm, such that the offset blanket has the desired resiliency and the like.

Figure 2:
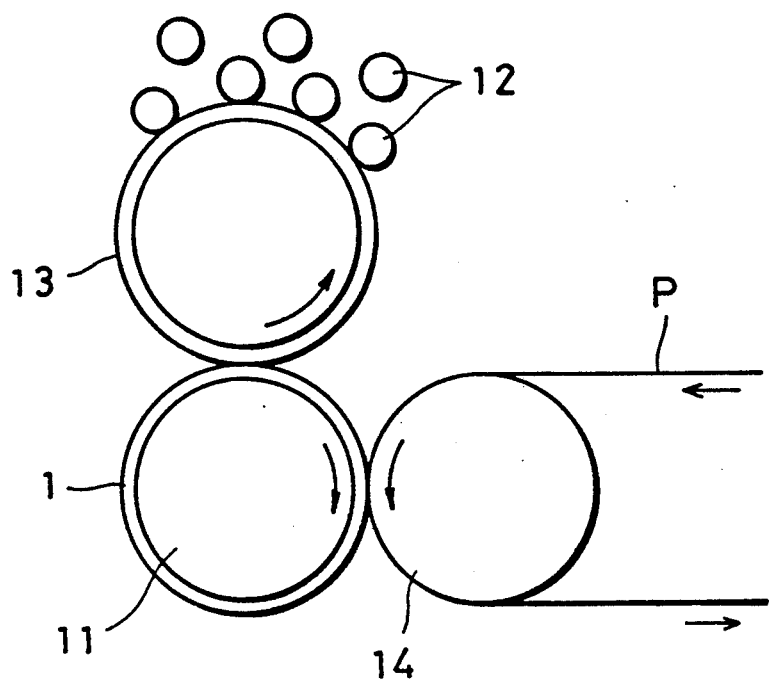
FIG. 2 is a view illustrating an offset printing machine.

FIG. 2 shows an offset printing machine using the offset blanket 1 having the arrangement above-mentioned.

In FIG. 2, a plate cylinder 13 is rotatingly driven by a power supply (not shown), and a group of ink supply rollers 12 are disposed around the periphery of the plate cylinder 13 at the upper portion thereof, these rollers being rotatable following the rotation of the plate cylinder 13. Printing inks are adapted to be supplied to the plate cylinder 13 when the same is driven. A blanket cylinder 11 on which the offset blanket 1 is wound, is disposed to come in contact with the periphery of the plate cylinder 13 at the lower portion thereof. An impression cylinder 14 is disposed to come in contact with the periphery of the offset blanket 1 at the lateral portion thereof. Both blanket cylinder 11 and impression cylinder 14 are rotatable following the rotation of the plate cylinder 13.

In the offset printing machine employing the printing method above-mentioned, when the plate cylinder 13 is driven, printing inks are transferred from the group of ink supply rollers 12 to an original plate pattern drawn on the plate cylinder 13. This causes the original design pattern to be formed on the plate cylinder 13 at the peripheral surface thereof.

Then, transferred to the offset blanket 1 is the original design pattern, which is then transferred to an article to be printed P such as printing paper which is continuously supplied between the offset blanket 1 and the impression cylinder 14. Thus, the original plate pattern on the plate cylinder 13 is printed on the article to be printed P.

In the offset lithography above-mentioned, a shock is exerted to the surface printing layer 2 by the plate cylinder 13. However, the porous primer layer 4 between the surface printing layer 2 and the support layer 3 absorbs this shock. This prevents the occurrence of "shock-streaks" or "gear-streaks" which may provoke defective printing.

Prior to printing, a portion of the surface printing layer 2 may be cut and peeled off to form a portion on which the inks are not to be applied, and a stencil number may be marked on this portion after the printing has been finished. In this case, such a portion of the surface printing layer 2 may be easily peeled off from the support layer 3 since the primer layer 4 has a porous structure containing thermoplastic hollow bodies or the like to provide a cohesive stress smaller than that in a non-porous primer layer.

For the primer layer 4 including closed cells, even though a portion of the surface printing layer 2 is peeled off, the printing inks do not pass through the primer layer 4 and the support layer 3 at their portions concerned, and subsequently the portion concerned of the support layer 3 is not penetrated by the printing inks. This provides the offset blanket 1 with better durability as compared with the primer layer 4 including open cells.

There were made a variety of samples of the primer layer 4 having different contents of the thermoplastic hollow bodies, and the peel strength of each sample was measured. The samples of the primer layer 4 include sample (A) made of a non-porous material, and samples (B), (C) & (D) each having a different content of the thermoplastic hollow bodies.

Sample (A) was made by 100 parts by weight of NBR, 60 parts by weight of a reinforcing filler, 5 parts by weight of a plasticizer, 5 parts by weight of zinc white, 3 parts by weight of stearic acid and 3 parts by weight of sulfur vulcanizing accelerator.

Samples (B), (C) and (D) were made by adding, saran microspheres of thermoplastic hollow bodies (SOMA-PEARL F30 manufactured by Somal Kogyo Co., Ltd.) to sample (A), as a porosity forming agent, in an amount of 8.9 parts by weight (4.7% by weight), 17.7 parts by weights (9.1% by weight) and 26.6 parts by weight (13.6% by weight) respectively, and vulcanizing each mixture thus obtained.

Figure 3:
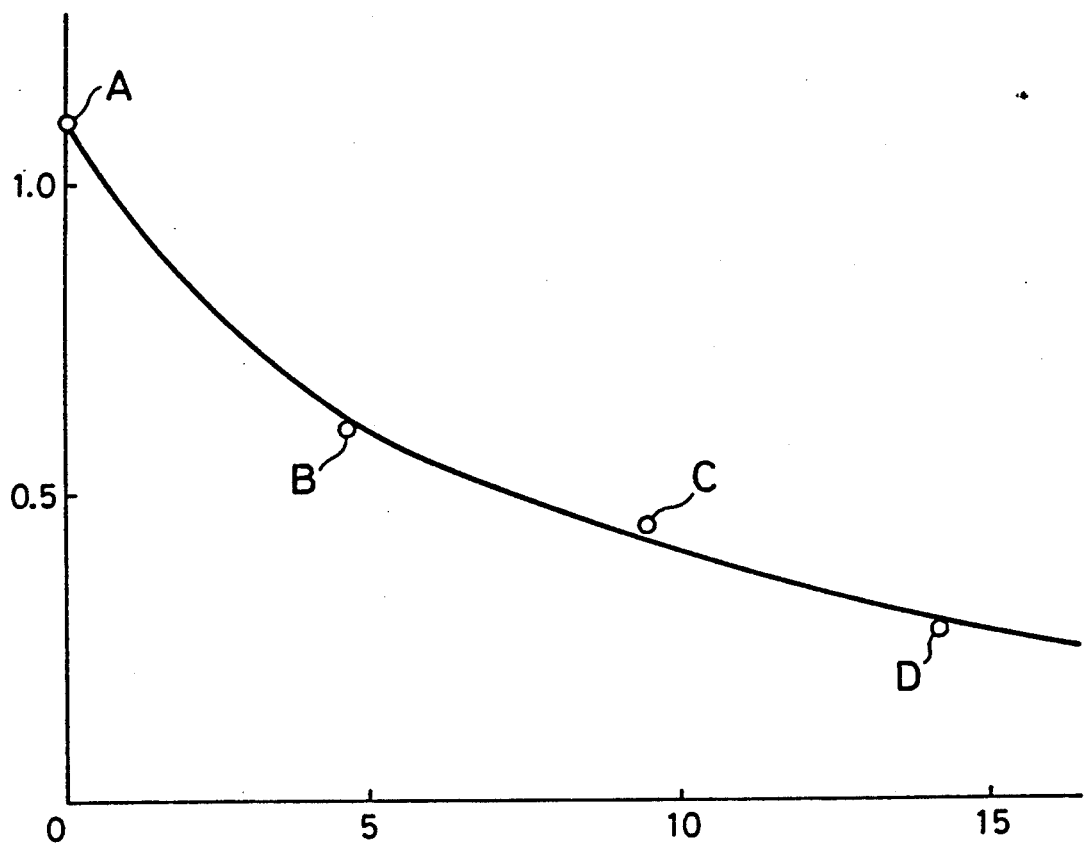
FIG. 3 is a graph showing the results of peel strength tests.
Figure 4:
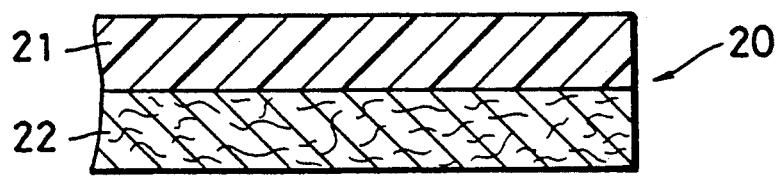
FIG. 4 is a schematic section view of a conventional offset blanket.

FIG. 3 is an orthogonal coordinates graph illustrating the measured results of peel strength of peeling the surface printing layer 2 from the primer layer 4 in samples (A) to (D), in which the axis of ordinate and the axis of abscissa respectively represent the peel strength (kg/cm) and the content of the porosity forming agent (% by weight).

It was found that when the peel strength was too great as in the case of sample (A), it was difficult to peel off the surface printing layer 2. It was found that when the peel strength was too small on the contrary, as in the case of sample (D), the surface printing layer 2 was easily peeled off in the course of the offset lithography. Accordingly, the peel strength is preferably set in a range from 0.3 to 0.7 kg/cm, and more preferably in a range from 0.4 to 0.6 kg/cm.

All samples (A) to (D) have the surface printing layer 2 and the support layer 3 finished according to the sam specifications.

In accordance with the offset blanket of the present invention, the primer layer for bonding the surface printing layer and the support layer is porous to provide a small cohesive stress, thereby to improve the peeling properties of the surface printing layer.

Further, since the primer layer is porous, the resiliency thereof is excellent to absorb a shock exerted between the surface printing layer and the impression cylinder. This improves the durability of the impression cylinder and the offset blanket. With the use of such an offset blanket, offset lithography of a high quality may be achieved,

What is claimed is:

1. An offset blanket consisting of, in lamination:
   a surface printing layer;
   a support layer for supporting said surface printing layer; and
   a porous bonding layer consisting of a foam body having a thickness of 20 to 100 μm disposed between said surface printing layer and said support layer,
   wherein the peel strength of peeling the surface printing layer from the support layer is in a range from 0.3 to 0.7 kg/cm.

2. An offset blanket according to claim 1, wherein the porous bonding layer is a foam body including cells having diameters in a range from 1 to 100 μm.

3. An offset blanket according to claim 1, wherein the porous bonding layer has voids in a range from 40 to 80%.

* * * * *